United States Patent [19]

Iwata et al.

[11] Patent Number: 5,067,462
[45] Date of Patent: Nov. 26, 1991

[54] CONTROL DEVICE AND METHOD FOR MULTICYLINDER ENGINE WITH A CYLINDER DISCRIMINATION FUNCTION

[75] Inventors: Toshio Iwata; Toshio Ohsawa, both of Himeji, Japan

[73] Assignee: Mitsubishi Denki K.K., Tokyo, Japan

[21] Appl. No.: 599,174

[22] Filed: Oct. 17, 1990

[30] Foreign Application Priority Data

Oct. 19, 1989 [JP] Japan .................. 1-270303

[51] Int. Cl.[5] .................................. F02P 5/04
[52] U.S. Cl. .................. 123/414; 123/425; 123/643
[58] Field of Search ............. 123/414, 416, 417, 425, 123/435, 626, 643

[56] References Cited

U.S. PATENT DOCUMENTS

| | | | |
|---|---|---|---|
| 4,116,173 | 9/1978 | McDougal et al. | 123/425 |
| 4,232,545 | 11/1980 | Dobler et al. | 123/425 X |
| 4,535,740 | 8/1985 | Ma | 123/425 X |
| 4,656,993 | 4/1987 | Yuzawa et al. | 123/414 X |
| 4,690,124 | 9/1987 | Higashiyama | 123/643 |
| 4,760,830 | 8/1988 | Bullis et al. | 123/425 X |
| 4,766,865 | 8/1988 | Hartel | 123/414 |
| 4,870,587 | 9/1989 | Kumagai | 123/414 X |
| 4,926,822 | 5/1990 | Ade et al. | 123/414 |
| 4,961,410 | 10/1990 | Matsumura et al. | 123/414 |
| 4,979,487 | 12/1990 | Fukui | 123/643 |

FOREIGN PATENT DOCUMENTS 0010658 10/1989 Japan .

*Primary Examiner*—Willis R. Wolfe
*Attorney, Agent, or Firm*—Sughrue, Mion, Zinn, Macpeak & Seas

[57] ABSTRACT

A control device for a multi-cylinder engine comprises, in addition to a sensor 11 for detecting reference rotational positions of the crank shaft 1, an ionization current detector 41 for detecting the ionization current across a spark plug 33 of a cylinder. From the output of the sensor 11, the microcomputer 40 discriminates the group of cylinders which are in the compression and the exhaust stroke. For a short period after the start of the engine, the group of cylinders in the compression and the exhaust stroke are ignited simultaneously. During this short period, the cylinder in the compression stroke is discriminated from the group of cylinders in the compression and the exhaust stroke, on the basis of the output of the ionization current detector 41, and the number of succesive discriminations of the cylinder in the compression stroke is counted. When this number reaches a predetermined number n, a flag F is set, such that only the cylinder in the compression stroke is supplied with the ignition current thereafter.

12 Claims, 4 Drawing Sheets

CONTROL DEVICE AND METHOD FOR MULTICYLINDER ENGINE WITH A CYLINDER DISCRIMINATION FUNCTION

BACKGROUND OF THE INVENTION

This invention relates to control devices and methods for multicylinder internal combustion engines such as those of a automobile, etc., which are capable of discriminating a particular cylinder of the engine; more particularly, this invention relates to such control devices and methods which are capable of accomplishing cylinder discrimination at a low cost.

Internal combustion engines, in particular, those for automobiles, etc., generally comprise a plurality of cylinders, and are operated at four stroke cycles of suction, compression, explosion (combustion), and exhaust. For obtaining higher operation efficiency of these engines, it is important to control the ignition timing or the fuel injection timing to precise moments corresponding to particular crank angles. Thus, in recent years, the ignition timing of the igniter and the fuel injection timing sequence of the injector are usually controlled by a microcomputer. The microcomputer receives, in addition to various operating conditions, reference position signals of respective cylinders and a cylinder discriminating signal for distinguishing a particular cylinder, and thereby discriminates the operating positions of respective cylinders and controls the ignition timings, etc., to the precise moments.

FIG. 5 shows such a conventional control device for controlling the operation timings of the respective cylinders of a four-cylinder engine.

In FIG. 5, a crank shaft 1 and a cam shaft 4 are coupled via a timing belt 3, such that the cam shaft 2 rotates once for every two rotations of the crank shaft 1. The operation timings of the four cylinders No. 1 through 4, each provided with a power transistor 31, an ignition coil 32, and a spark plug 33, are displaced from each other by a half rotation (180 degrees) of the crank shaft, in the order indicated in the figure, such that for example, the operational timings of the cylinders No. 1 and No. 4 are displaced by 360 degrees from each other. A detector disk 5 for detecting the reference positions is coupled to the cam shaft 2 via a rotation shaft 4, to be rotated together therewith. The disk 5 is provided with four outer slits or windows 6, corresponding to the reference positions of respective cylinders, Nos. 1 through 4 and an inner window 7 for discriminating a particular cylinder (e.g., cylinder No. 1). On a fixing plate 8 are disposed a pair of photosensors 9 and 10 consisting of photocouplers.

The photosensor 9 detects the windows 6 and generates a reference position signal L1 consisting of a train of pulses representing the reference positions of the respective cylinders. The signal L1 is usually referred to by the acronym SGT. Each one of the pulses of L1 rises at the first reference position (75 degrees before top dead center, abbreviated to B75°) and falls at the second reference position (5 degrees before top dead center, or B5°) of one of the four cylinders No. 1 through No. 4 corresponding thereto. The photosensor 10 detects the window 7 and generates a cylinder discriminating signal L2 corresponding to the particular cylinder (e.g., cylinder No. 1). The signal L2, usually referred to by the acronym SGC, is outputted upon generation of those pulses of the signal L1 which correspond to the particular cylinder.

On the other hand, another reference position sensor 11, consisting of a proximity sensor or a reflection type photosensor, etc., is disposed at the crank shaft 1 to generate a reference position signal L once for every rotation of the crank shaft 1, for example.

The electrical control unit (ECU) 20 consisting of a microcomputer receives the signals L1, L2, and L, and controls, on the basis of the signals L1, and L2, for example, the ignition timings of respective cylinders, in the predetermined order No. 1, No. 3, No. 4, and No. 2, by turning on the power transistor 31 of respective ignition coils 32 so as to generate a spark across the ignition plug 33 of respective cylinders at the precise moment.

The electrical control unit 20 may control the ignition timings on the basis of the signal L from the position sensor 11. In this connection, it should be noted, as mentioned above, that the phases of the pair of cylinders No. 1 and No. 4 (or those of the pair of cylinders No. 3 and 2) are displaced by one rotation (360 degrees) of the crank shaft 1. Thus, when one of the pair of cylinders No. 1 and No. 4 (or No. 3 and No. 2) is in the compression stroke, the other of the pair is in the exhaust stroke. The reference position signal L generated by the sensor 11 at the crank shaft 1 corresponds to the reference positions of the pair of cylinders at the compression or the exhaust stroke. Thus, in the case where the microcomputer 20 utilizes only the reference signal L, it cannot discriminate between the two cylinders which are in the compression stroke and the exhaust stroke, respectively. Thus, in such case, the two cylinders No. 1 and No. 4 (or No. 3 and No. 2) which are in the compression and the exhaust stroke, respectively, are ignited simultaneously. There is no particular harm in igniting the cylinder in the exhaust stroke, since no explosion (combustion) takes place therein.

The control device for an internal combustion engine of FIG. 5, however, has the following disadvantage. For the purpose of discriminating the compression stroke of each one of the cylinders, it should be provided with a cylinder discriminating sensor 10 in addition to the reference position sensor 9. Thus, when a sensor system is adopted wherein the reference position sensor 11 is mounted at the crank shaft 1 while the cylinder discriminating sensor 10 is mounted at the cam shaft 2, the mounting structure of the sensor system becomes complicated and expensive. On the other hand, if the reference position sensor 11 alone is utilized in the control of the operational timing of cylinders, the two cylinders which are in the compression and the exhaust stroke, respectively, cannot be discriminated between, and hence spurious ignition currents are supplied to the cylinder in the exhaust stroke. This results in a useless dissipation of electric power.

SUMMARY OF THE INVENTION

It is therefore an object of this invention to provide a control device and method for a multicylinder engine, whereby the mounting structure of the sensor system can be simplified and rendered economical while useless dissipation of power resulting from the supply of ignition current to the cylinders in the exhaust stroke is effectively prevented, thereby reducing both the production and running costs thereof.

The above objects are accomplished according to the principle of this invention by a control device for controlling operational timings of a multi-cylinder internal combustion engine, which comprises: a cylinder group discriminating means for discriminating a group of cylinders of a multi-cylinder internal combustion engine which are in a compression and an exhaust stoke; a cylinder discriminating means for discriminating from among the group of cylinders discriminated by said cylinder group discriminating means a cylinder in the compression stroke; and a control means for controlling operational timings of each cylinder of the engine independently in response to an output from the cylinder discriminating means.

Preferably, the cylinder discriminating means comprises an ionization current detector circuit which detects each occurence of ionization currents across a spark plug of a cylinder of the internal combustion engine. Alternatively, the cylinder discrimination means comprises an ignition voltage waveform detector which detects a secondary side voltage waveform of an ignition coil of a cylinder of the internal combustion engine. Further, it is preferred that the cylinder discriminating means comprises means for counting a number of successive cylinder discriminations, wherein the cylinder discriminating means judges that a cylinder discrimination is established when said number reaches a predermined number.

The objects of this invention are also accomplished according to the principle of this invention by a control method for controlling operational timings of a multi-cylinder internal combustion engine, which comprises the steps of: (a) discriminating a group of cylinders in a compression and an exhaust stroke; (b) controlling simultaneously operational timings of the group of cylinders discriminated to be in the compression and the exhaust stroke; (c) discriminating from the group of cylinders in the compression and the exhaust stroke a cylinder in the compression stroke; and (d) controlling operational timings of each cylinder of the engine independently after a discrimination of the cylinder in the compression stroke is established. Preferably, the step (b) consists of controlling simultaneously ignitions of the group of cylinders discriminated to be in the compression and the exhaust stroke, wherein the group of cylinders in the compression and the exhaust stroke are ignited simultaneously; and the step (d) consists of controlling ignitions of each cylinder of the engine independently after a discrimination of the cylinder in the compression stroke is established, wherein only a cylinder in the compression stroke is ignited.

BRIEF DESCRIPTION OF THE DRAWINGS

The novel features which are believed to be characteristic of this invention are set forth with particularity in the appended claims. This invention itself, however, may best be understood from the detailed description of the preferred embodiments taken in connection with the accompanying drawings, in which:

In the drawings, like reference numerals represent like or corresponding parts.

DETAILED DESCRIPTION OF THE PREFERRED EMBODIMENTS

Figure 1:
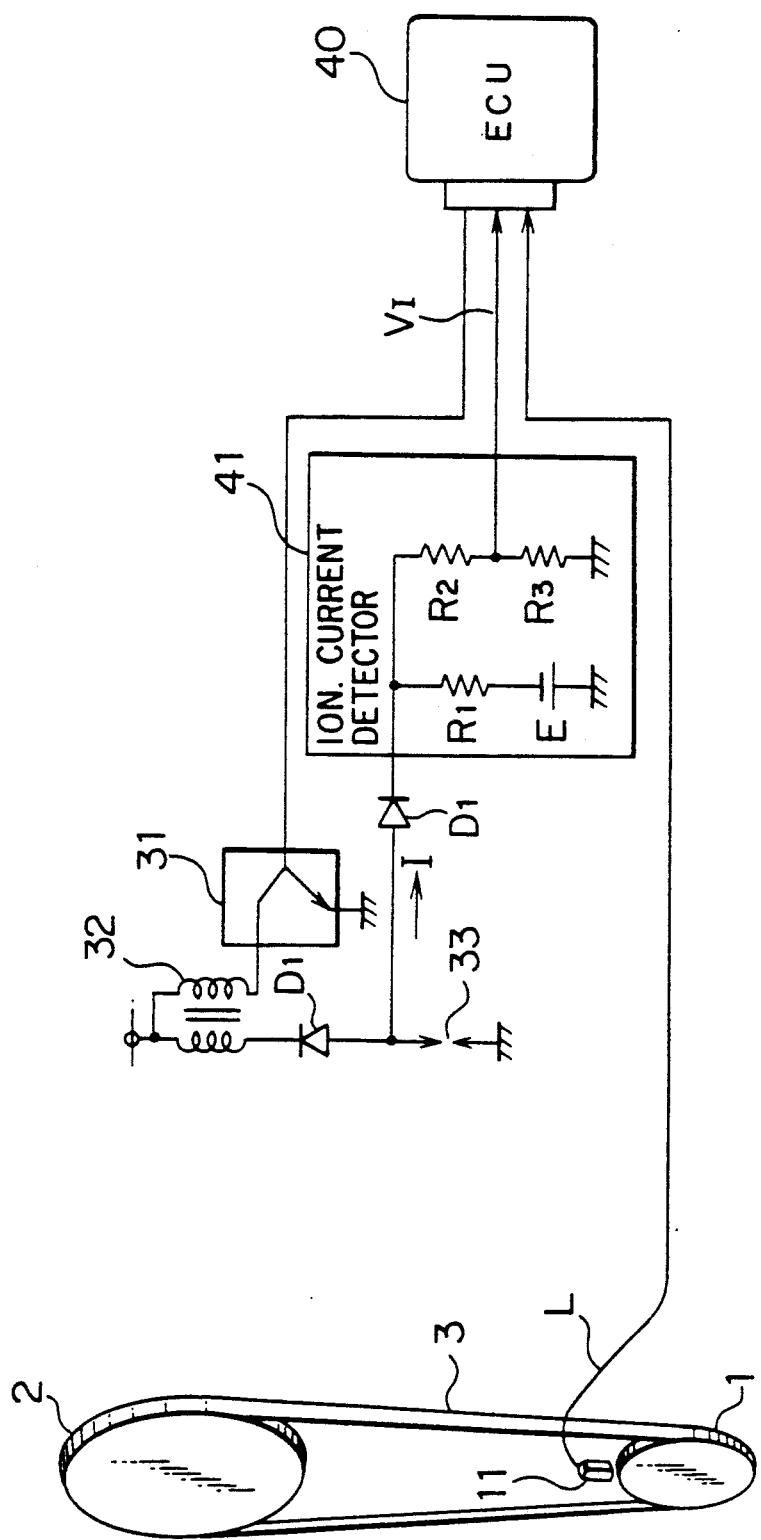
FIG. 1 is a schematic diagram showing a control device for a multicylinder engine according to this invention.
Figure 2:
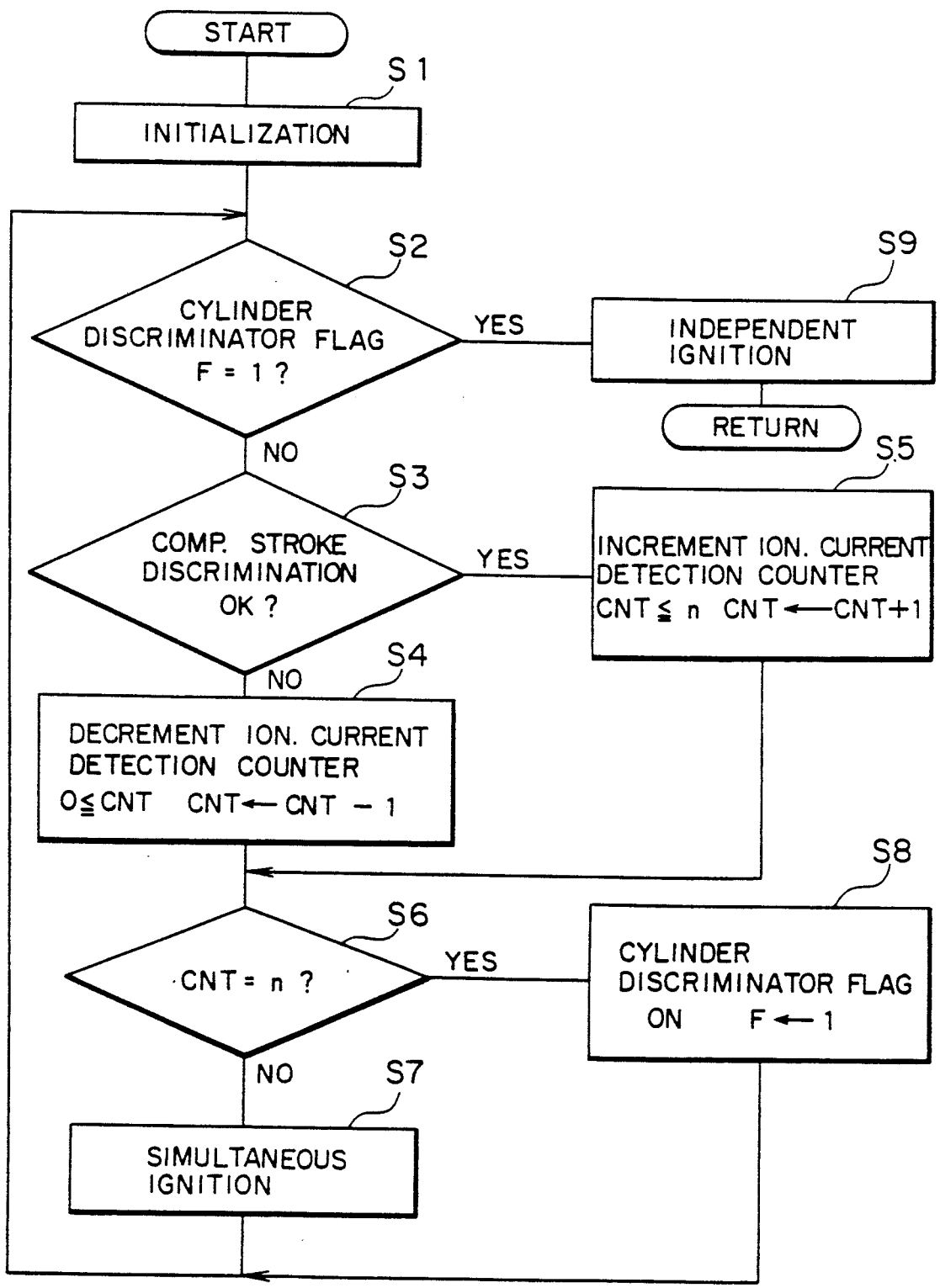
FIG. 2 is a flowchart showing the cylinder discrimination routine followed by the control device of FIG. 1.

Referring now to FIGS. 1 and 2 of the drawings, a control device and method for a four-cylinder automotive engine with a cylinder discrimination function according to the first embodiment of this invention is described.

Figure 5:
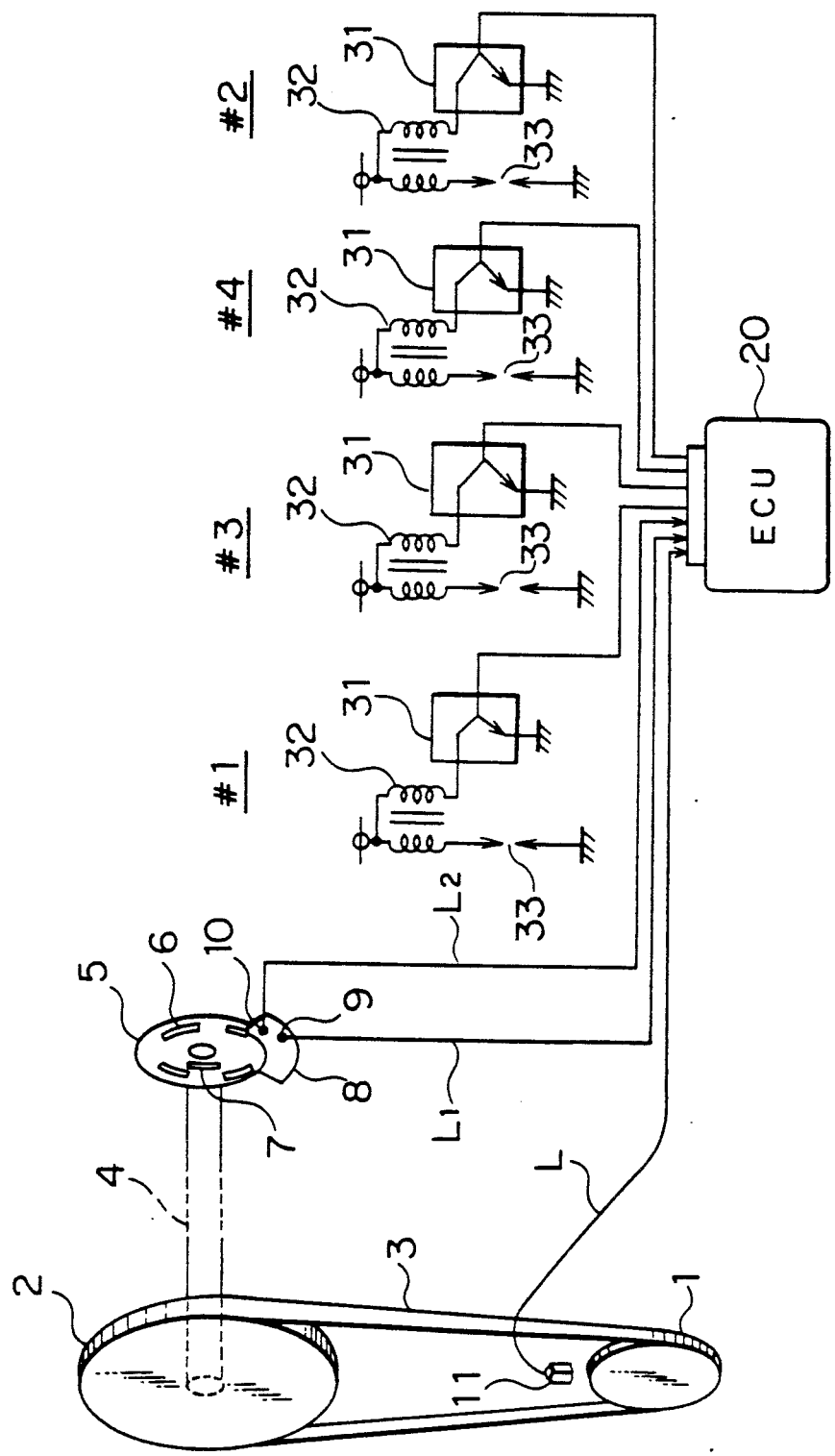
FIG. 5 is a diagram similar to that of FIG. 1, but showing the organization of a conventional control device.

A crank shaft 1 and a cam shaft 2 are coupled via a timing belt 3, such that the cam shaft 2 rotates once for every two rotations of the crank shaft 1. Each one of the four cylinders is provided with an ignition circuit comprising a power transistor 31, an ignition coil 32, and a spark plug 33. (Referr to FIG. 5; FIG. 1 shows only one of the ignition circuits of the four cylinders). A reference position sensor 11, consisting of a proximity sensor, etc., is disposed at the crank shaft 1 to generate a reference position signal L once for every half rotation (180 degrees) and for every one rotation (360 degrees) of the crank shaft 1, such that the electrical control unit 40 can discriminate, on the basis of the signal L, the group of two cylinders (e.g., cylinders No. 1 and No. 4, or the cylinders No. 2 and No. 3) which are currently in the compression and the exhaust stroke. Thus, the sensor 11 constitutes (together with the program stored in the electrical control unit 40, as described hereinbelow) the cylinder group discriminating means according to this invention. The electrical control unit (ECU) 40, consisting of a microcomputer, controls, as described in detail hereinbelow, the ignition timings of respective cylinders, by turning on the power transistor 31 of the ignition coil 32 so as to generate a spark across the ignition plug 33 of each cylinder at the precise moment.

The ionization current detector 41, constituting (together with the program stored in the microcomputer 40) the cylinder discriminating means according to this invention, comprises: a serial circuit (connected across the ground and the non-grounded side of the spark plug 33) consisting of a DC voltage source E constituting the ionization current source, and of a resistor R1; and a voltage divider, coupled in parallel with the serial circuit of the voltage source E and resistor R1, consisting of resistors R2 and R3, whose junction point constitutes the output terminal of the ionization current detector 41 from which the output signal $V_I$ is outputted to the electrical control unit 40. A diode D1 for preventing reverse current is inserted between the spark plug 33 and the secondary side of the ignition coil 32. Further, another diode D2 for preventing reverse current is inserted between the non-grounded side of the spark plug 33 and the junction point of the resistors R1 and R2. The ionization current detector 41 may be provided for the spark plug 33 of one cylinder only (e.g., the cylinder No. 1), or for each one of the spark plugs 33 of all the four cylinders.

The ionization current I flows through the ionization current detector 41 only when the ignition voltage is supplied to the associated cylinder when it is in the compression stroke. Thus, as described in detail hereinbelow, the electrical control unit 40 can discriminate, from among the group of two cylinders currently in the compression or the exhaust stroke which are discriminated by the reference position signal L of the reference position sensor 11, the cylinder in the compression stroke on the basis of the output signal $V_I$ of the ionization current detector 41.

Next, the ignition control operation of the device of FIG. 1 is described by reference to FIG. 2, which shows the flowchart of the cylinder discriminating interrupt routine of the microcomputer 40.

First, at the initialization step S1, the counter CNT representing the number of successive ionization current detections and the flag F representing the establishment of the cylinder discrimination are initialized, i.e., are set to 0 (zero). Further, the predetermined number n which serves, as described below, as the reference number for the establishment of the cylinder discrimination is set.

Next, at step S2, the flag F is referenced so as to judge whether the cylinder discrimination is established already (i.e., F=1) or not.

In the initialized state, the cylinder discrimination is not yet established and hence F=0, so that the execution proceeds to step S3, where it is judged whether the discrimination of the compression stroke is possible or not on the basis of the output $V_I$ of the ionization current detector 41, which represents the presence of the ionization current I with respect to the cylinder associated with the ionization current detector 41.

For some length of time after the initialization, the four cylinders are under the simultaneous ignition control. Namely, the fuel injection is effected in all the cylinders and the group of cylinders (e.g., the cylinders No. 1 and No. 4) having a phase difference of 180 degrees (i.e., 360 degrees with respect to the crank angle) which are currently in the compression and the exhaust stroke are ignited simultaneously. That is, the reference position sensor 11 generates the reference position signals L for every one half rotation (180 degrees) and for every one rotation (360 degrees) of the crank shaft 1, and the electrical control unit (microcomputer) 40 discriminates, in response to this signal L, the group of two cylinders which are in the compression and the exhaust stroke, such that the cylinders of the discriminated group may be ignited simultaneously. If the ignited cylinder is in the compression stroke, the explosion (combustion) takes place upon discharge across the spark plug 33, such that multitude of ions are generated across the spark plug 33. On the other hand, if the ignited cylinder is in the exhaust stroke, the explosion does not take place in the cylinder of the ignition plug, so that hardly any ions are generated thereacross. The ionization current detector 41 detects the ionization current I which flows from the DC voltage source E thereof and across the ignition plug 33. It outputs the voltage $V_I$ (corresponding to the ionization current I) from the junction between the resistors R2 and R3 of the voltage divider thereof.

Thus, if the inputted voltage $V_I$ is less than a predetermined threshold value, the electrical control unit 40 judges at step S3 that the discrimination of the compression stroke is impossible, and proceeds to step S4, where the counter CNT is decremented by one. However, the value of the counter CNT is clipped at the minimum 0, such that it does not take a negative value.

On the other hand, if the voltage $V_I$ is above the threshold value, the microcomputer 40 determines at step S3 that the cylinder in question is in the compression stroke, and proceeds to step S5 where the counter CNT is incremented. However, the value of the counter CNT is clipped at the maximum number n such that it does not exceed the predetermined number n whose value is set at the initialization step S1.

At the step S6 subsequent to the decrement or increment of the counter CNT at step S4 or S5, it is judged whether the counter CNT is equal to the predetermined number n. If the counter CNT is not yet equal to the number n, the execution proceeds to the next step S7 so as to effect the simultaneous ignition control, as described above, and returns thereafter to step S2.

On the other hand, if the counter CNT has reached the predetermined number n at step S6, the execution proceeds to step S8 where the flag F is set (F←1), and returns thereafter to step S2.

Thus, the flag F is set (F←1) only when the compression strokes are discriminated successively for predetermined number n, such that the erroneous setting of the cylinder discriminator flag F is prevented, thereby enhancing the reliability of the cylinder discrimination.

After a number of cylinder discrimination cycles as described above, the cylinder discriminator flag F is finally set after some time after the initialization. Then, the establishment of the cylinder discrimination (i.e., F=1) is determined at step S2, and the execution proceeds therefrom to step S9 where the independent ignition is effected, thereby terminating the cylinder discrimination interrupt routine of FIG. 2.

The independent ignition control at step S9 is effected as follows. On the basis of the output signal $V_I$ of the ionization current detector 41, the microcomputer 40 discriminates, from among the group of cylinders in the compression and the exhaust stroke discriminated on the basis of the signal L from the position sensor 11, the cylinder in the compression stroke, and outputs the driving signal corresponding thereto to the power transistors 31. Thus, the driving signal is outputted only to the power transistor 31 of the cylinders which are near the end of the compression stroke.

Thus, according to this invention, simultaneous ignition control is effected at step S7 until the cylinder discrimination on the basis of the detection of the ionization current I is established; and the independent ignition control is effected at step S9 after the cylinder discrimination is established. The discrimination of the group of cylinders in the compression and the exhaust stroke is effected on the basis of the output L of the reference position sensor 11. On the other hand, the discrimination of the cylinder in the compression stroke is effected on the basis of the output $V_I$ of the ionization current detector 41, which thus performs the function of the cylinder discrimination sensor 10 of the conventional control device of FIG. 5. Thus, according to this invention, the independent ignition control, which does not dissipate electric power uselessly, can be effected by means of a simple sensor organization which does not utilize the cylinder discrimination sensor 10 of the conventional control device. On the other hand, if the system according to this invention is utilized together with the cylinder discrimination sensor 10 shown in FIG. 5, for example, the erroneous discrimination of the cylinders can be prevented with further enhanced certainty, and hence a highly reliable ignition control is realized.

It goes without saying that although the above embodiment relates to the ignition control only, this invention is applicable to the fuel injection control as well. In the case of the fuel injection control, simultaneous injection to all the cylinders is effected during the time when the cylinder discrimination is not yet established after the initialization. Sequential injection for respective cylinders (i.e., successive fuel injection for the cylinders in the compression stroke) is effected after the establishment of the cylinder discrimination.

Further, the above embodiment can be subjected to a variety of modifications. For example, although the ionization current I during the simultaneous ignition control is detected in the above embodiment for the purpose of discriminating the cylinder in the compression stroke (i.e., the cylinder which are about to enter into the combustion stroke), inner pressures of cylinders may be detected instead of the ionization current I for the same purpose, by means of pressure sensors disposed within the cylinders. In such case, the cylinder which exhibits a pressure level above a predetermined level at top dead center (TDC) is discriminated to be in the compression stroke.

Figure 3:
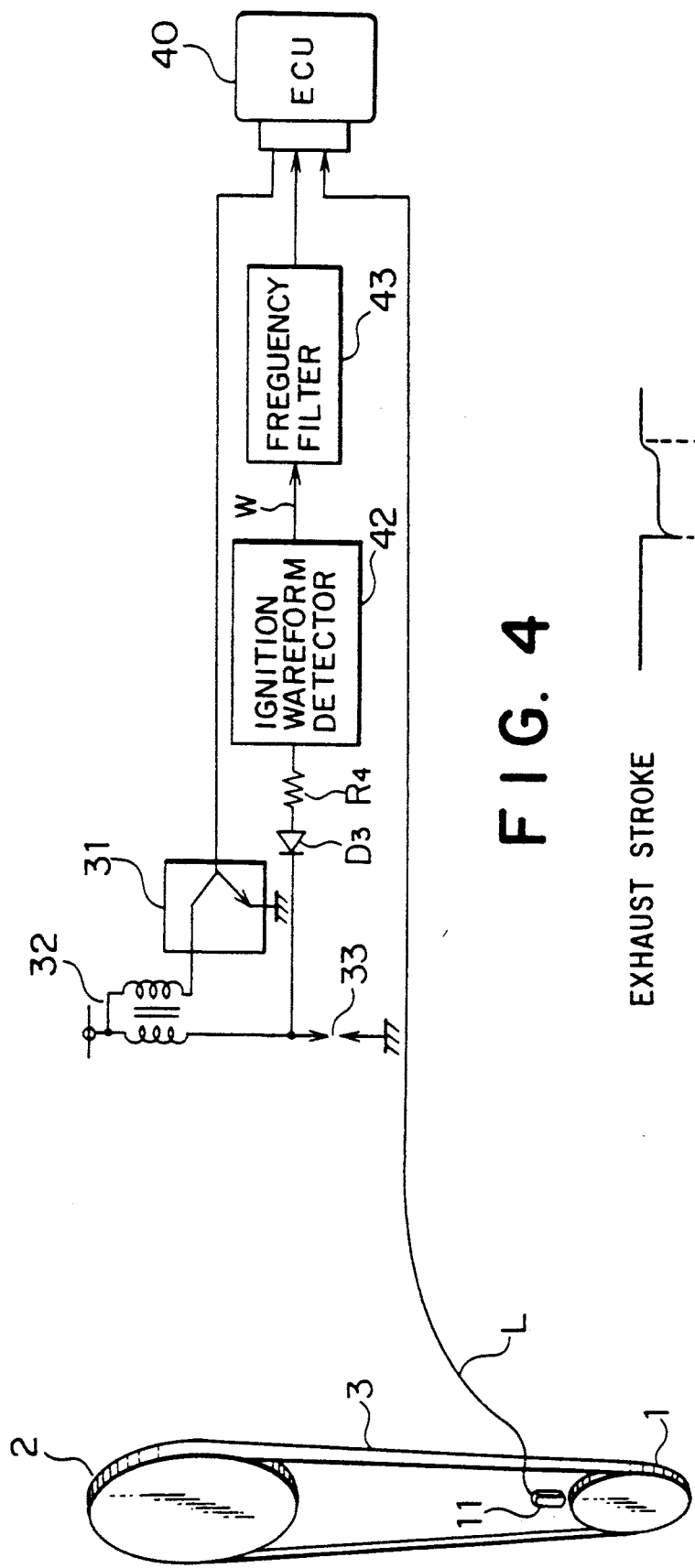
FIG. 3 is a diagram similar to that of FIG. 1, but showing a control device according to another embodiment of this invention.

Furthermore, as shown in FIG. 3, the cylinder discriminating means according to this invention may consist of a ignition voltage waveform detector 42, instead of the ionization current detector 41. In such case, the ignition voltage waveform detector 42 detects the waveform of the ignition voltage across the ignition plug 33, i.e., the waveform W of the secondary side voltage of the ignition coil 32. In FIG. 3, serial circuit of a diode D3 for preventing the reverse current, a load resistor R4, and a waverform detector 42, is connected across the non-grounded side of the ignition plug 33 and an input to the microcomputer 40. A frequency filter (i.e., a high pass filter) 43 may be inserted between the waveform detector 42 and the input to the microcomputer 40.

Figure 4:
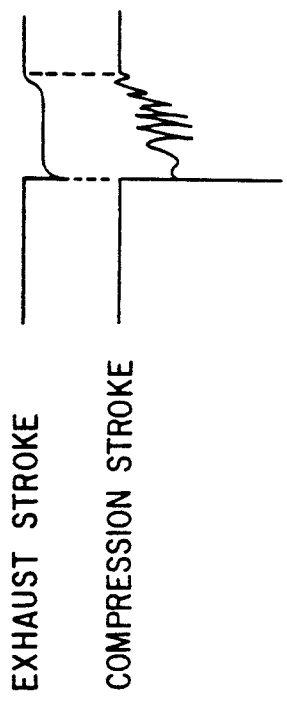
FIG. 4 shows ignition voltage waveforms utilized by the control device of FIG. 3.

The method of operation of the circuit of FIG. 3 is as follows. FIG. 4 shows the secondary side voltage waveforms W of the ignition coil 32 when an ignition is effected. When the associated cylinder is in the exhaust stroke, there appears in the waveform W a small peak at the initial stage of the discharge, the waveform remaining smooth thereafter (the waveform at the top in FIG. 4). On the other hand, when the associated cylinder is in the compression stroke, there appears a high peak at the initial stage of the discharge, to be followed by an irregular waveform consisting of high frequency components resulting from the combustion and explosion in the cylinder (the waveform at the bottom).

If the cylinder discrimination is effected solely on the basis of the peak level of the secondary side voltage waveform W, the frequency filter 43 can be dispensed with, since the initial peak waveform level is sufficient for the cylinder discrimination. However, in the case where the cylinder discrimination is effected on the basis of the integral of secondary voltage waveform W, it is preferred that the frequency filter 43 is inserted. If the integral of the secondary voltage waveform W is utilized for the cylinder discrimination, the higher frequency components subsequent to the initial peak are also detected, and the reliability of the discrimination of the cylinder in the compression stroke can thus be further enhanced.

In the case of the embodiment of FIG. 3, the secondary voltage waveform W indicative of the state of the ignition spark discharge is detected by the ignition waveform detector 42, the output of which is inputted to the control unit (microcomputer) 40 via the frequency filter 43. The control unit 40 compares with a predetermined level the peak level of the secondary voltage waveform W, or the level of the integral of the output of the filter 43, and determines that the cylinder in question is in the compression stroke when the peak level or the level of the integral of the output of the filter 43 is above the predetermined level. Apart from this, the method of operation is the same as that shown in FIG. 2, the counter CNT storing the number of detections of the high level of the output of the filter 43 (or of the detector 42, when the filter 43 is not utilized).

While description has been made of the particular embodiments of this invention, it will be understood that many modifications may be made without departing from the spirit thereof. The appended claims are contemplated to cover any such modifications as fall within the true spirit and scope of this invention.

What is claimed is:

1. A control method for controlling operational timing of a multi-cylinder internal combustion engine, comprising the steps of:
   discriminating a group of cylinders in a compression and an exhaust stroke;
   controlling simultaneously operational timing of the group of cylinders discriminated to be in the compression and the exhaust stroke;
   discriminating from the group of cylinders in the compression and the exhaust stroke an individual cylinder in the compression stroke by monitoring an internal condition in at least one cylinder in said group of cylinders; and
   controlling operational timing of each cylinder of the engine independently after a discrimination of the cylinder in the compression stroke is established.

2. A control device as claimed in claim 1, wherein the cylinder in the compression stroke is discriminated from the group of cylinders by electrically monitoring ignition plugs of cylinders in said group of cylinders.

3. A control method for controlling operational timing of a multi-cylinder internal combustion engine, comprising the steps of:
   discriminating a group of cylinders in a compression and an exhaust stroke;
   controlling simultaneously ignitions of the group of cylinders discriminated to be in the compression and the exhaust stroke, wherein the group of cylinders in the compression and the exhaust stroke are ignited simultaneously;
   discriminating from the group of cylinders in the compression and the exhaust stroke an individual cylinder in the compression stroke by electrically monitoring ignition plugs of said group of cylinders; and
   controlling ignitions of each cylinder of the engine independently after a discrimination of the cylinder in the compression stroke is established, wherein only a cylinder in the compression stroke is ignited.

4. A control method as claimed in claim 3, wherein the cylinder in the compression stroke is discriminated from the group of cylinders in the compression and the exhaust stroke by detecting an ionization current of the cylinder.

5. A control method as claimed in claim 3, wherein the cylinder in the compression stroke is discriminated from the group of cylinders in the compression and the exhaust stroke by detecting a secondary side voltage waveform of an ignition coil of the cylinder.

6. A control method as claimed in claim 3, wherein the discrimination of the cylinder in the compression stroke is established when a number of successive cylinder discriminations reaches a predetermined number.

7. A control device for controlling operational timing of a multi-cylinder internal combustion engine, comprising:

cylinder group discriminating means for discriminating a group of cylinders of a multi-cylinder internal combustion engine which are in a compression and an exhaust stroke;

cylinder discriminating means for discriminating from among the group of cylinders discriminated by said cylinder group discriminating means an individual cylinder in the compression stroke by measuring an internal reaction in at least one cylinder in said group of cylinders; and control means for controlling operational timings of each cylinder of the engine independently in response to an output from the cylinder discriminating means.

8. A control device as claimed in claim 7, wherein said cylinder discriminating means comprises an ionization current detector circuit which detects each occurrence of ionization currents across a spark plug of a cylinder of the internal combustion engine.

9. A control device as claimed in claim 7, wherein said cylinder discrimination means comprises an ignition voltage waveform detector which detects a secondary side voltage waveform of an ignition coil of a cylinder of the internal combustion engine.

10. A control device as claimed in claim 7, wherein said cylinder discriminating means comprises means for counting a number of successive cylinder discriminations, wherein the cylinder discriminating means judges that a cylinder discrimination is established when said number reaches a predetermined number, thereby indicating that said discriminating means has correctly and successively identified said predetermined number of cylinders in a compression stroke.

11. A control device as claimed in claim 7, wherein said cylinder group discrimination means comprises a sensor for detecting a reference rotational position of a crankshaft of the engine.

12. A control device as claimed in claim 7, wherein said cylinder discriminating means is connected to ignition plugs of said group of cylinders in order to measure said reaction.

* * * * *